United States Patent [19]

Munk et al.

[11] Patent Number: 4,564,375

[45] Date of Patent: Jan. 14, 1986

[54] HUMIDIFICATION APPARATUS

[76] Inventors: Evelyn Munk; Michael Munk, both of 28 Dorchester Dr., New York, N.Y. 10573

[21] Appl. No.: 697,335

[22] Filed: Feb. 1, 1985

Related U.S. Application Data

[63] Continuation of Ser. No. 514,887, Jul. 18, 1983, abandoned.

[51] Int. Cl.[4] .......... B01D 50/00

[52] U.S. Cl. .......... 55/259; 55/277; 239/102; 261/DIG. 15

[58] Field of Search .......... 55/15, 228, 259, 269, 55/277, 257 HC; 261/DIG. 15, DIG. 48; 239/102

[56] References Cited

U.S. PATENT DOCUMENTS

| | | | |
|---|---|---|---|
| 2,519,619 | 8/1950 | Yellott et al. | 55/277 |
| 2,935,375 | 5/1960 | Boucher | 55/15 |
| 3,299,620 | 1/1967 | Hollingworth | 55/258 X |
| 3,473,298 | 10/1969 | Berman | 55/257 HC |
| 3,494,099 | 2/1970 | Eng et al. | 55/15 X |
| 3,638,859 | 2/1972 | Macfarlane | 239/102 |
| 3,774,846 | 11/1973 | Schurig et al. | 261/DIG. 48 |
| 4,118,945 | 10/1978 | Boochever et al. | 62/176 C |
| 4,257,389 | 3/1981 | Texider et al. | 261/DIG. 15 |
| 4,386,738 | 6/1983 | Bauver | 239/102 |

*Primary Examiner*—Charles Hart
*Attorney, Agent, or Firm*—Martin Novack

[57] ABSTRACT

A typical embodiment of the invention reduces the load on an air conditioner and provides more efficient evaporative cooling, humidification and filtering. Improved cooling and humidification is the result of an ultrasonic fog generator which reduces liquid droplet size to about ten microns for flash evaporation. A silica-containing filter, moreover, has an affinity for mechanically unfilterable residual calcium-containing particulate matter that is entrained in the humidified air, in order to extract this matter from the treated air.

1 Claim, 8 Drawing Figures

HUMIDIFICATION APPARATUS

This is a continuation of copending U.S. application Ser. No. 514,887 filed July 18, 1983 and now anbandoned.

FIELD OF THE INVENTION

The present invention relates to an environmental air humidification and evaporative cooling system and more particularly, to a cooling system that is built as a unit complete with blowers, filters and an ultrasonic fog chamber for environmental atmosphere control, and the like.

PRIOR ART

Certain closed environments, such as computer rooms, require air conditioning that has a fixed cooling and rigid humidity control for a proper machine environment. More recently the disc peripherals associated with these computer devices require even higher levels of room humidity than that which heretofore had been needed. In known systems, moreover, dehumidification and cooling are achieved by the control of cooling coils. Humidification is achieved by evaporating water within the body of the air conditioning unit through immersion heaters, evaporation lamps, or in some cases, through steam injection often through a unit-mounted steam generator.

In prior art systems, air is heated by equipment operated within the computer room and is returned to the air conditioning unit. This return air is drawn through filters and blown through cooling coils. The cooling coils are temperature controlled to satisfy either the discharge temperature or the room temperature directly. The humidity in the room is sensed and the unit will dehumidify (or humidify) to maintain the room set point. By use of the air conditioning controls during humidification, the air must be far enough from saturation to accept moisture and this causes subcooling to accomodate the additional moisture and an inherent temperature rise due to the humidification apparatus.

In known air conditioning units, air is cooled in evaporator units which are completely dependent on the ambient dry bulb temperature of the air therein. Thus, if the air that is entering the unit has been heated by equipment in the environment, or if it is outside air drawn in during a hot summer period, the air conditioning unit has an overall lower performance and lower efficiency.

Closed environment air conditioning systems also require winter cooling as well as winter humidification. In the winter, air conditioning systems have normal operating ranges of from 74° to 78° F. and from 20 to 16% relative humidity. In environments of this type, such as in buildings, it can be shown that the internal vapor pressure is essentially in equilibrium with the external vapor pressure. Additionally, there is a stack effect created by the cold heavy air mass against the warm dry air of the building. Therefore, winter humidification as well as cooling is a desirable characteristic in the system.

Known devices that are used for positive humidity control for winter humidification have significant energy consumption. For example steam grids add humidity effectively but can increase steam consumption significantly, as well as boiler water make-up rates. Some steam systems are sources of odors due to chemical treatment of the steam, many of which chemicals are environmentally undesirable or even hazardous. Air washers of the cellular or spray type usually require additional and significant fan horsepower as well as extensive chemical treatment to prevent scale and biological fouling.

There are, in general, two further main types of humidifiers in the prior art. Each of these two types is subject to its own respective major limitations. Electric humidifiers, for example, are difficult and costly to maintain. The mineral accretions that are common among these electric humidifiers cause high failure ratio. "Wet pan" units rapidly become septic and are known sources of respiratory infection such as pneumonitus or legionnaires disease.

Consequently, there is a need for a reliable humidifier that will control the humidity in a closed environment in a reliable, efficient manner that overcomes many of the inadequacies of existing humidifier equipment.

DESCRIPTION OF THE INVENTION

These and other difficulties that have characterized the prior art are overcome, to a great extent, through the practice of the invention. For example, a self contained humidification system is provided for use within a computer room. The illustrative unit can be positioned alternatively in a remote location, i.e., a service area, and connected by ductwork to the space served. Warm dry air is drawn from the room to the unit and conditioned by the unit. Ductwork is used to return the air to the room after it has been conditioned through evaporative cooling processes.

The standard additions to any heating and ventilating unit, such as cooling coils, outside air ventailation and enthalpy changeover functions each can be added to an ultrasonic humidification unit that characterizes the invention.

Further in this respect, the present invention utilizes the ultrasonic field created by directing a high energy air stream against a parabolic reflector to shatter pneumatically atomized water particles into five to ten micron particles. A tuneable resonator controls the patterns of these fog particles to distribute them through the circulating air that is to be conditioned.

Because volume is a function of the cube of the atomized water particle radius, and the surface area of the particle is a function of the square of the particle radius, for very small particle sizes the exposed surface area becomes large compared to the weight of the particle. As particles are emitted at very high velocities (well above Mach 1) heat is transferred from the receiving air stream to these particles causing them to flash into vapor in a change of state from the liquid phase of the vapor phase, leaving no residual liquid.

Minerals dissolved in the water supply are evaporated to dryness by means of this ultrasonic apparatus and are passed through the ultrasonic field to move with the conditioned air. As an example, a 10 micron particle, having total dissolved solids of 100 parts/million (mg/L) upon flashing will free a $10^{-3}$ micron mineral particle. Particles below $10^{-1}$ micron in size no longer obey Stokes Law of gravitational attraction, but obey the well postulated laws of Brownian movement where motion by molecular collisions sustain the particles.

Consequently, these particles are of a size which makes them mechanically unfilterable. Discharging these minute particles through a filter of fiberglass in which the primary constituent is silica, however, permits an ionic bonding between particles and filter in which the filter's silica attracts the primary particle constituent of calcium. In this way, the bonding creates a calcium silicate surface on the filter through which only a few particles are able to pass.

If the conditioned environment houses equipment and processes that are so sensitive that no particulate matter of any size or composition can be tolerated, in accordance with the invention, the water first is purified by passage through a semi-permeable membrane before it is supplied to the ultrasonic fog generator.

A typical demineralization process, in accordance with this aspect of the invention, is accomplished through a reverse osmosis device which may consist of cylindrical semipermeable membranes rolled into pressure vessels and packaged with circulating pumps through which the raw water is circulated.

It is an object of the present invention to provide a cooling and humidification system that can be used in atmospheric conditions throughout the entire year and which will operate at greater efficiencies than known systems.

It is a further object of the present invention to provide a system that can lend itself to the modification of existing air conditioning units.

These and other objects of the present invention are achieved by the cooling and humidification system of the present invention. Thus, simultaneous cooling and humidification is effected by crossflow spraying of the atomized water into the return or mixed air stream of the system to effect evaporative cooling and humidification even during winter conditions. By depressing the temperature of the entering air through evaporative cooling, the condensing cooling means of the system will benefit in both performance and efficiency. The evaporative cooling of the recirculating air mass will reduce the dry bulb temperature adiabatically at the wet bulb temperature, thereby substantially offsetting the use of cooling energy in systems that do not use mixing or economizer cycles for outdoor air cooling usage. Additionally, the stack effect condition can be considerably alleviated through humidification which increases the mass density of the air.

Accordingly, the present invention comprises an apparatus that produces extremely small particles of water for humidification purposes and removes minerals dissolved in the humidifying water in spite of the small size of these airborne mineral particles. For a more complete understanding of the invention, attention is invited to the following detailed description of preferred embodiments. The scope of the invention, however, is limited only through the claims appended hereto.

DETAILED DESCRIPTION OF THE PREFERRED EMBODIMENTS

Figure 1:
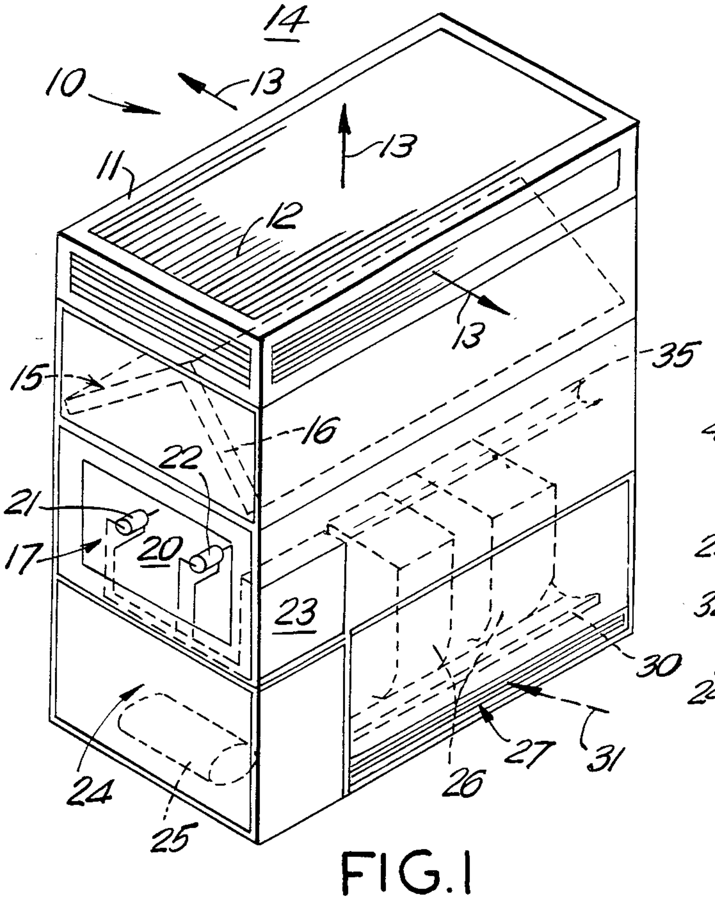
FIG. 1 is a perspective view of a cooling and humidification unit according to the present invention.

FIG. 1 shows a typical humidification unit 10 having a top 11 with grillage and louvers 12 to direct the flow of conditioned air in the directions of arrows 13 to a room 14. An angle bank array 15 of fiberglass filters 16 have appropriate supporting structure and removable closure panels (not shown). In accordance with the invention, a fogging chamber 17 has on opposite ends one of a pair of windows (of which only window 20 is shown). Ultrasonic fog generators 21,22 are mounted in the window 20 in order to protrude into the fogging chamber 17. The fog generators 21,22 will be described subsequently in more complete detail. A control cubicle 23 houses switches, relays and contactors for regulating the operation of the unit 10.

An air compressor compartment 24 is provided with removable side panels to provide service access to air compressor 25. Circulating fans 26, of which standard double width double inlet centrifugal blowers with v-belt drives and motors are suitable for the purpose of the invention are shown in the base of the unit 10 adjacent to the air compressor 25. An air inlet grille 27 is provided on both sides of the unit 10, although only the grill 27 is shown in FIG. 1. Dust stop filters 30 also are installed to maintain the cleanliness of the fan compartment and to remove particulate matter from room air flowing into the unit 10 in the direction of arrow 31.

Figure 2:
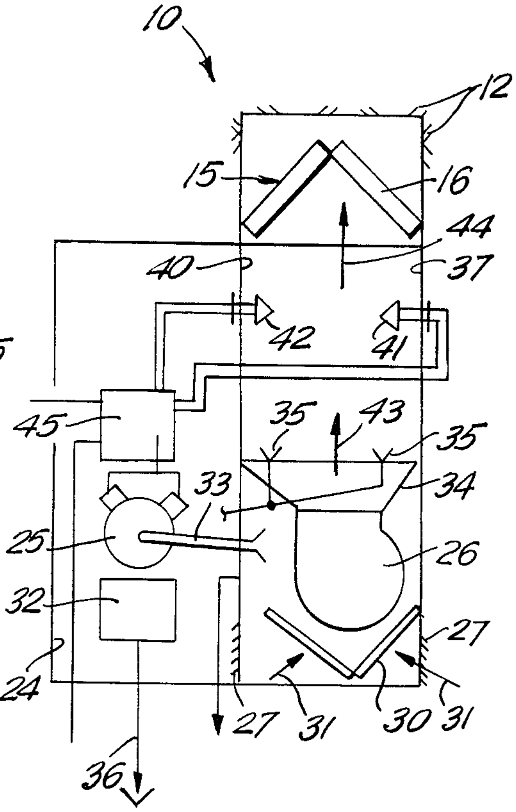
FIG. 2 is a schematic diagram of a typical embodiment of the invention.

FIG. 2 schematically illustrates a humidification system that embodies principles of the invention. Thus, the dust stop filters 30 permit air to be drawn in the direction of the arrows 31 through the inlet grille 27 of the humidification unit 10. The circulating fan 26 is spaced longitudinally from the dust stop filters 30. As shown, electrical motor starters 32 for the air compressor 25 and the fan 26 are spaced laterally from the circulating fan 26 and longitudinally from the air compressor 25 in the air compressor compartment 24. A compressed air duct 33 establishes fluid communication from the air compressor 25 to the portion of the compartment that is adjacent to the circulating fan 26 for ultrasonic fog generation purposes described subsequently in more detail. A diverging air discharge diffuser 34 provides a transition from the fan 26 to the sides of the humidification unit 10.

As described subsequently in more complete detail, a drain down gutter 35 extends transversely across the diffuser 34 in order to channel water droplets that precipitate from the atmosphere within the unit 10 into a waste water drain 36. Spaced longitudinally above and in general alignment with the discharge diffuser are a pair of transversely spaced windows 37,40 that close apertures in the unit 10. Each of the windows 37,40 supports a respective fogger 41,42 to humidify the air flowing through the unit 10 in the direction of arrows 43,44. Thus, as illustrated, the air flowing from the foggers 41,42 in the direction of the arrow 44 pass through the angle bank array 15,16 of filters before flowing out of the unit 10 through the louvers 12. Note also, in accordance with an aspect of the invention, that the filters in the angle bank array 15,16 are of fiberglass, a silica containing material, or other suitable material that will promote bonding between the substance of the filter and the minute, mechanically unfilterable mineral particles that are entrained in the air flowing into the array in the direction of the arrow 44.

A control panel 45, to initiate and to deactivate operation of the humidification unit 10, also is supported in the control cubicle 23 (FIG. 1) longitudinally spaced from the air compressor 25.

Figure 3:
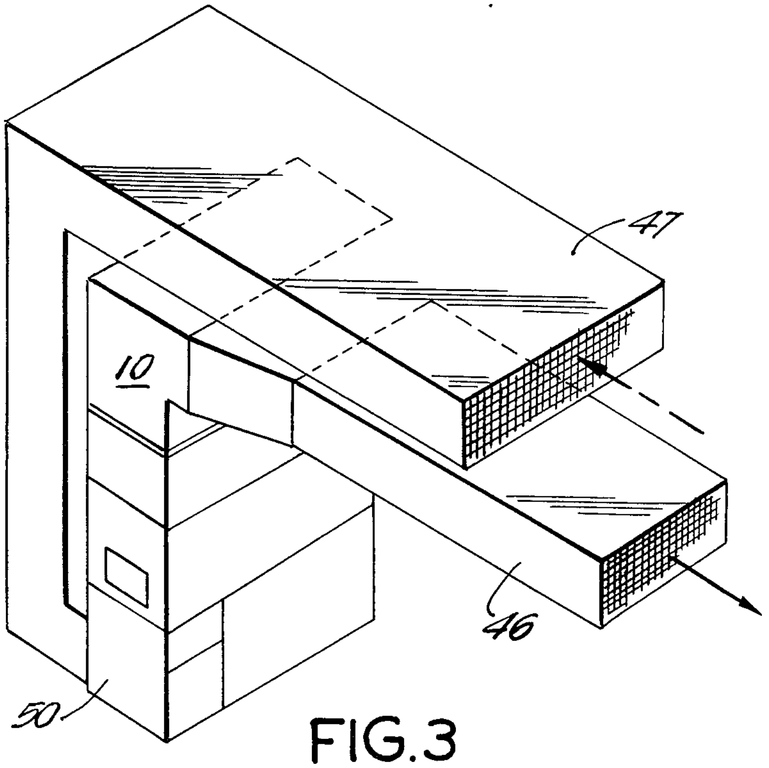
FIG. 3 is a perspective view of an embodiment of the invention applicable to installation in a remote location.

Attention now is invited to FIG. 3 which shows external supply, or discharge duct 46 and return or intake duct 47, whereby the louvers 12 (FIG. 1) are replaced by the return duct that is connected to the base 50 of the unit 10. In this manner, apparatus characterizing the invention can be installed in a service room that is remote from the room in which the computer is located.

Figure 8:
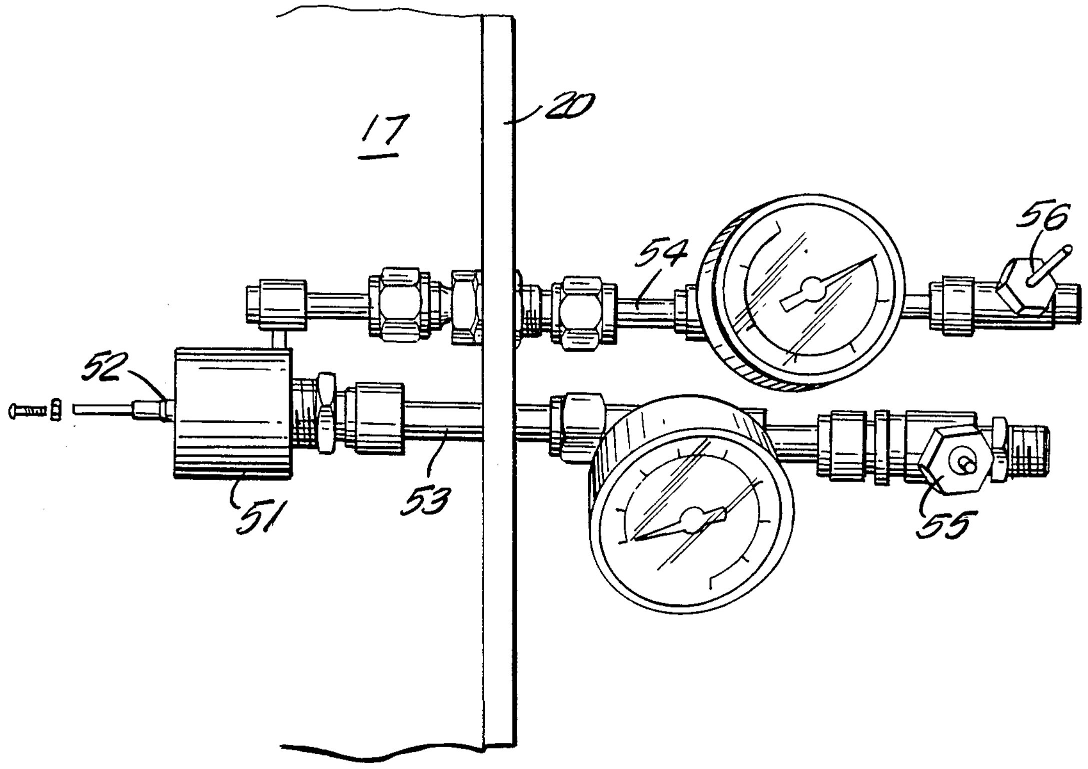
FIG. 8 illustrates an ultrasonic fog generator unit complete with mounting window, indicator gauges and needle valves, in accordance with the invention.

As best shown in FIG. 8, a nozzle 51 sprays water thru a tuneable ultrasonic field 52 which deflects a spray cone (not shown) outward into the air being conditioned within the fogging chamber 17 (FIG. 1). Both compressed air from the compressor 25 and water are directed through respective conduits 53,54 (FIG. 8) and are controlled through individual air and water needle valves respectively. As shown in FIG. 8 the conduits 53,54 penetrate and are mounted in the window 20 of the fogging chamber 17.

Figure 7:
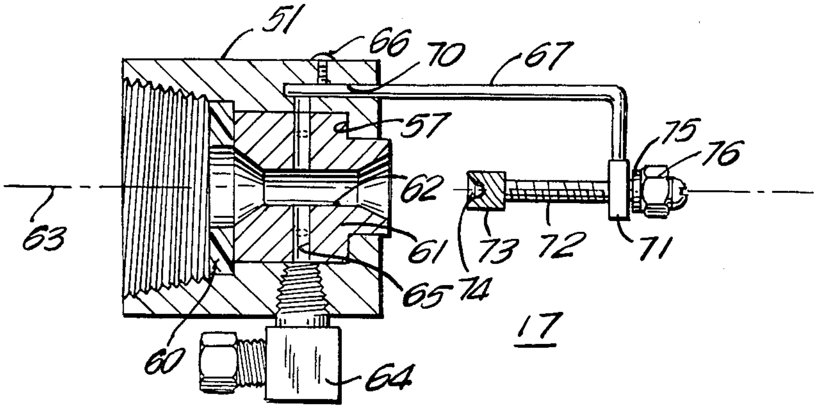
FIG. 7 is a detailed drawing in full section of an ultrasonic fog generator for a fogging chamber in accordance with the invention.

Turning now to FIG. 7, the high velocity gas flow from the air compressor 25 (FIG. 1) creates a standing sonic shock wave that atomizes humidifying water into micron-sized droplets. Thus, the nozzle 51 comprises a generally cylindrical member that has a central bore 57 coincident with the nozzle's longitudinal axis. the bore 57 has, on one side of the nozzle 51 a threaded surface that mates with a correspondingly threaded end of the compressed air conduit 53 (FIG. 8) which protrudes into the fogging chamber 17.

Turning once more to FIG. 7, within the nozzle 51, the threading terminates in an annular gland 60 that is pressed against a generally cylindrical orifice member 61 that is seated snugly within the bore 57. The orifice member has a longitudinal passageway 62 formed in axial alignment with longitudinal axis 63 of the nozzle 51. Thus, the passageway 62 in the orifice member 61 establishes fluid communication between the bore 51 and the fogging chamber 17.

In accordance with a feature of the invention, a water connector 64 communicates with the passageway 62 through a transversely disposed conduit 65. A set screw 66 secures an extreme end of the shank of a "L" shaped standoff 67 in a recess 70 formed in the transverse end of the nozzle 51 through which the orifice member 61 penetrates. The short end of the standoff 67 is provided with an internally threaded eye 71, the center of which is an alignment with the axis 63. A tuning screw 72 penetrates the eye 71 in order to space a resonator cup 73 from the end of the passageway 62 in the orifice member 61. As illustrated, the resonator cup 73 has, on the side facing the passageway 62, a parabolic recess 74 for atomizing the mixture of compressed air and water that escaped through the passageway 62.

The longitudinal distance between the end of the passageway 62 in the adjacent transverse surface of the nozzle 51 and the parabolic recess 74 in the resonator cup 73 is adjusted by advancing or withdrawing the threaded tuning screw through the eye 71 in order to establish the desired tuning field 52. Upon establishing this appropriate spacing, the tuning screw 72 is locked in place by threading lock washer 75 and lock nut 76 on the shank of the tuning screw 72 against the eye 71.

As the pressurized air flows into the nozzle 51, water flows through the conduit 65 and mixes with the air in the passageway 62, to enable a shock wave formed in the tuneable field 52 to vigorously shear into fine droplets of about 10 microns in size. the approaching water particles. The resonator cup 73 reflects ultrasonic gas against the emerging water particles in a manner that reduces the emerging 100 micron particles to 10 micron particles and deflects these minute particles outward for cross flow mixing with the primary air stream that is coming from the circulating fan 26 (FIG. 2) in the direction of the arrows 43,44. The resonator gap, or tuning field 51 (FIG. 8) is adjusted to shape the fog discharge to match the air flow thru the fogging chamber 17. This air, which is returning to the unit, acts simultaneously to flash cool or evaporatively cool and humidify the returning air thereby causing the temperature of the air to drop as the air is being humidified. The air is then filtered through the angle bank array 15,16 (FIG. 2) where the affinity between the calcium in the residual particulate matter entrained in the air stream after vaporization combines with the silica in the filter to purify the air vapor mixture. This air-vapor mixture after filtering flows into an air conditioning unit (not shown) and, because of its low temperature thus reducing the cooling load on the air conditioner. The condensed spray, or unused moisture, flows into the drain down gutter 35 and, through the waste water drain 36, flows from the bottom of the humidification unit 10.

The use of the ultrasonic field, as mentioned above reduces the size of about 75% of the water particles to the 10 micron range. Any solids that are present in the air stream or in the water, moreover, are removed through the filters 15,16.

Figure 4:
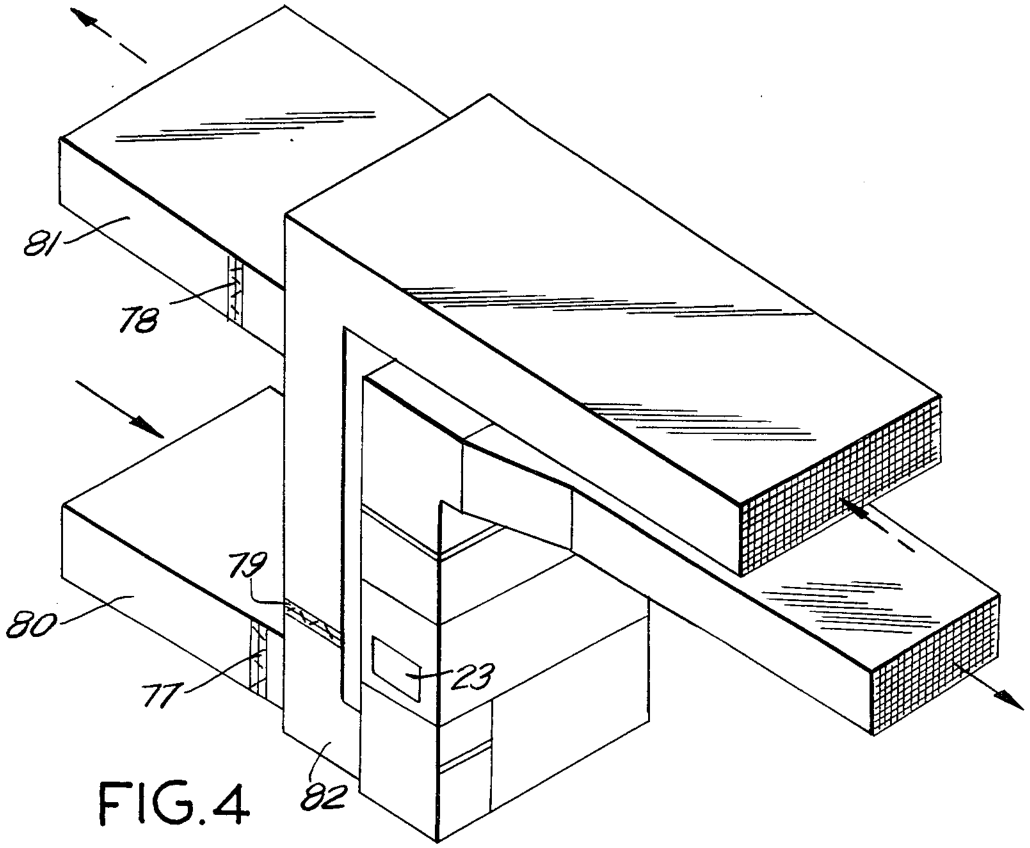
FIG. 4 is a perspective view of an embodiment of the invention that draws outside intake air and exhausts this air back into the outside atmosphere.

As illustrated in FIG. 4 control dampers 77, 78 and 79 respectively, regulate air flow through an outside air intake duct 80, an exhaust duct 81 and a mixing duct 82. These ducts 80, 81 and 82 are regulated through temperature controls in the control cubicle 23 to provide a suitable mixture of fresh, outside air and recirculated air commensurate with temperature and humidity needs.

Figure 5:
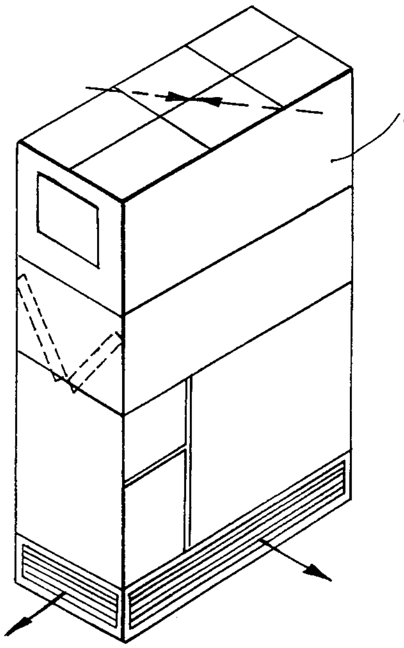
FIG. 5 shows a unit embodying principles of the invention with a top air intake and an underfloor discharge for the conditioned air.

In FIG. 5, the humidification unit 83 receives room air through top intake filters and the intake air for the duct 83 flows downwardly or discharge from the bottom of the unit and for underfloor delivery.

Figure 6:
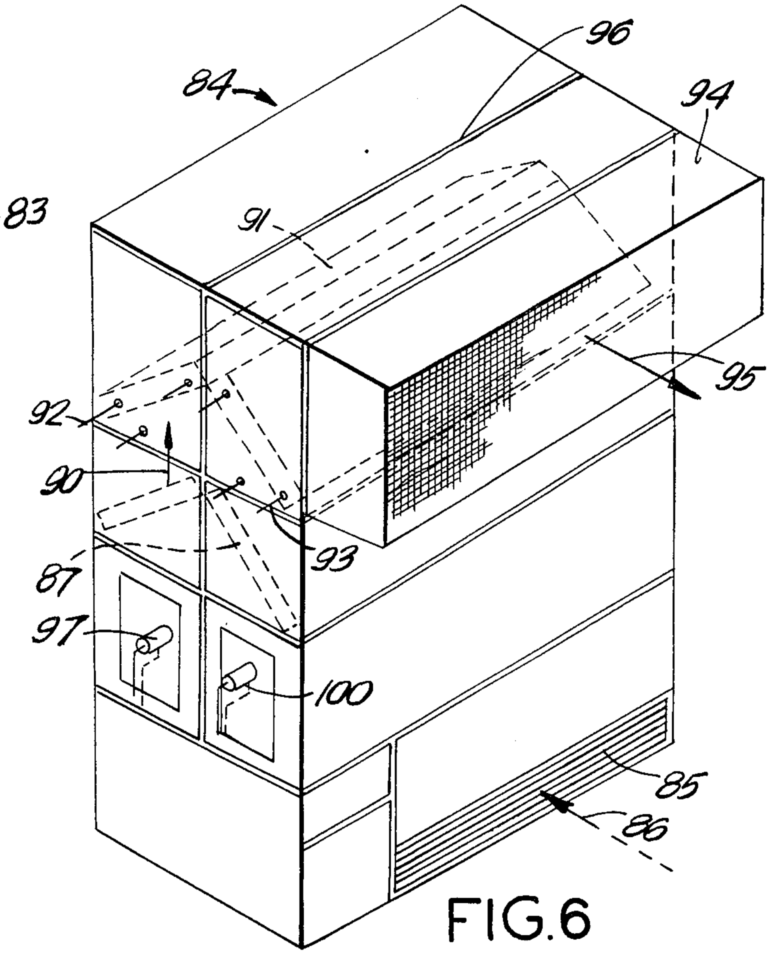
FIG. 6 is a diagram of another embodiment of the invention with a different arrangement of cooling coils shown in phantom lines.

FIG. 6 illustrates a combined humidifying and cooling unit 84. As shown, air that is to be treated is drawn into the unit 84 through an inlet grille 85 in the direction of arrow 86. The air thus drawn into the unit 84 is humidified in the manner described in connection with the embodiment of the invention shown in FIGS. 1 and 2. As the humidified air, however, is discharged from angle bank array of filters 87 that remove particulate matter entrained in the air, the filtered and humidified air flows in the direction of arrow 90 in order to pass through an "A frame" cooling coil 91. The cooling coil 91 actually houses two separate cooling circuits 92,93, each in a respective limb of the "A frame" cooling coil 91. After flowing through the coil 91, the now humidified, filtered and cooled air is discharged form the unit 84 through a duct 94 in the direction of arrow 95.

A longitudinal partition 96 separates the unit 84 into two, individually controlled halves, in which each of the individual atmospheric control components also are separately regulated. As shown fog generators 97,100 and the cooling circuits 92,93 each can be individually controlled to produce a desired atmosphere. Illustratively, external temperature and humidity sensors can control the fog generators 97,100 to respond to decreased humidity. If the temperature increases one of the fog generators will be deactivated through the operation of the valving and controls (not shown) associated with the associated one of the cooling circuits 92,93.

Thus, there is provided, in accordance with salient features of the invention, an improved system for simultaneously humidifying and evaporatively cooling air. This is accomplished in a manner, moreover, that not only reduces the load imposed on the air conditioner as a consequence of more efficient, ultrasonic fog particle generation and evaporation of the smaller water particles thus produced, but also filters out otherwise unfilterable micronsized solid residue through the chemical affinity between calcium, the major particulate constituent, and silica, a major constituent of the filter. Stated differently, there is taught in this disclosure an atmospheric humidifier for vaporizing demineralized ultrapure water and generating ultrapure fog without measurable mineral content. Such water has a tremendous affinity and requires all wetted surfaces to be made of chemically inert materials. Also stainless steel or plastic is needed for fog nozzles, control valving and piping conduits.

I claim:

1. Apparatus for humidifying and evaporatively cooling the air in a room, comprising:

an enclosure having an inlet port for receiving room air;

a fogging chamber in said enclosure, communicating with said input port;

an outlet port communicating with said fogging chamber for returning air to the room;

a circulating fan for creating a draft of air through said inlet port, fogging chamber, and outlet port;

an ultrasonic fogging device disposed in said fogging chamber, the fogging device including: a nozzle having an elongated open-ended passageway formed therein for receiving a supply of compressed air and an opening which communicates with said passageway through which a supply of water can enter the passageway; a parabolic resonator cup spaced from and facing the opening of the nozzle passageway; manually adjustable mounting means for said resonator cup for manually adjusting the spacing between said resonator cup and the opening of the nozzle passageway; said fogging device being oriented in said fogging chamber such that said spacing is transverse the direction of air circulation through said chamber; and a filter disposed in said enclosure in the path of the humidified and cooled air from said fogging chamber, said filter containing silica to combine with calcium-containing residue in the humidified air.

* * * * *